United States Patent
King et al.

(10) Patent No.: US 10,014,889 B2
(45) Date of Patent: Jul. 3, 2018

(54) FRONT END ARCHITECTURE WITH FILTERS HAVING DIFFERENT OUT OF BAND ATTENUATION

(71) Applicant: Skyworks Solutions, Inc., Woburn, MA (US)

(72) Inventors: Joel Richard King, Newbury Park, CA (US); Peter Phu Tran, Corona, CA (US); Nick Cheng, Thousand Oaks, CA (US); David Richard Pehlke, Westlake Village, CA (US)

(73) Assignee: Skyworks Solutions, Inc., Woburn, MA (US)

(*) Notice: Subject to any disclaimer, the term of this patent is extended or adjusted under 35 U.S.C. 154(b) by 0 days.

(21) Appl. No.: 15/391,621

(22) Filed: Dec. 27, 2016

(65) Prior Publication Data

US 2017/0111066 A1    Apr. 20, 2017

Related U.S. Application Data

(62) Division of application No. 14/821,041, filed on Aug. 7, 2015, now Pat. No. 9,572,052.

(60) Provisional application No. 62/034,924, filed on Aug. 8, 2014, provisional application No. 62/038,111, filed on Aug. 15, 2014.

(51) Int. Cl.
  *H04L 27/38* (2006.01)
  *H04B 1/04* (2006.01)

(52) U.S. Cl.
  CPC .................. *H04B 1/0475* (2013.01)

(58) Field of Classification Search
  CPC .......... H03F 3/19; H03F 3/193; H03F 1/0211; H02M 3/00; H04W 72/0453; H04W 24/02; H04L 43/028
  USPC .......... 455/188.1, 422.1; 330/294; 340/7.54; 398/135
  See application file for complete search history.

(56) References Cited

U.S. PATENT DOCUMENTS

| 6,181,208 B1 | 1/2001 | King et al. |
| 6,359,514 B1 | 3/2002 | King et al. |
| (Continued) | | |

FOREIGN PATENT DOCUMENTS

| CN | 1574705 | 2/2005 |
| CN | 102036430 | 4/2011 |
| JP | 2010-147589 | 7/2010 |

OTHER PUBLICATIONS

International Search Report dated Dec. 31, 2015 for International Application No. PCT/US2015/044364, filed Aug. 7, 2015. 3 pages.
(Continued)

*Primary Examiner* — Phuoc H Doan
(74) *Attorney, Agent, or Firm* — Knobbe, Martens, Olson & Bear, LLP

(57) ABSTRACT

In an embodiment, an apparatus includes a first transmit path, a second transmit path, and a switch element. The first transmit path can provide a first radio frequency (RF) signal in accordance with a nominal specification. The second transmit path can provide a second RF signal in accordance with an intermittent specification, in which the first and second RF signals are within the same transmit band. The switch element can provide the first RF signal as a transmit mode output in a first state and provide the second RF signal as the transmit mode output in a second state.

21 Claims, 12 Drawing Sheets

(56) References Cited

U.S. PATENT DOCUMENTS

| | | |
|---|---|---|
| 6,472,935 B2 | 10/2002 | King et al. |
| 6,782,208 B1 | 8/2004 | Lundhom et al. |
| 8,638,819 B2 | 1/2014 | Chen et al. |
| 2002/0090974 A1 | 7/2002 | Hagn |
| 2005/0208918 A1 | 9/2005 | Rowe et al. |
| 2008/0278136 A1 | 11/2008 | Murtojarvi |
| 2010/0040178 A1 | 2/2010 | Sutton et al. |
| 2010/0105340 A1 | 4/2010 | Weissman |
| 2010/0128689 A1 | 5/2010 | Yoon et al. |
| 2013/0065541 A1 | 3/2013 | Lum et al. |
| 2013/0165132 A1 | 6/2013 | Goedken et al. |
| 2013/0217341 A1 | 8/2013 | Jones et al. |
| 2013/0271221 A1* | 10/2013 | Levesque ............... H03F 3/193 330/294 |
| 2013/0273859 A1 | 10/2013 | King et al. |
| 2015/0133067 A1 | 5/2015 | Chang et al. |
| 2016/0044677 A1 | 2/2016 | King et al. |

OTHER PUBLICATIONS

Written Opinion dated Dec. 31, 2015 for International Application No. PCT/US2015/044364, filed Aug. 7, 2015. 9 pages.

\* cited by examiner

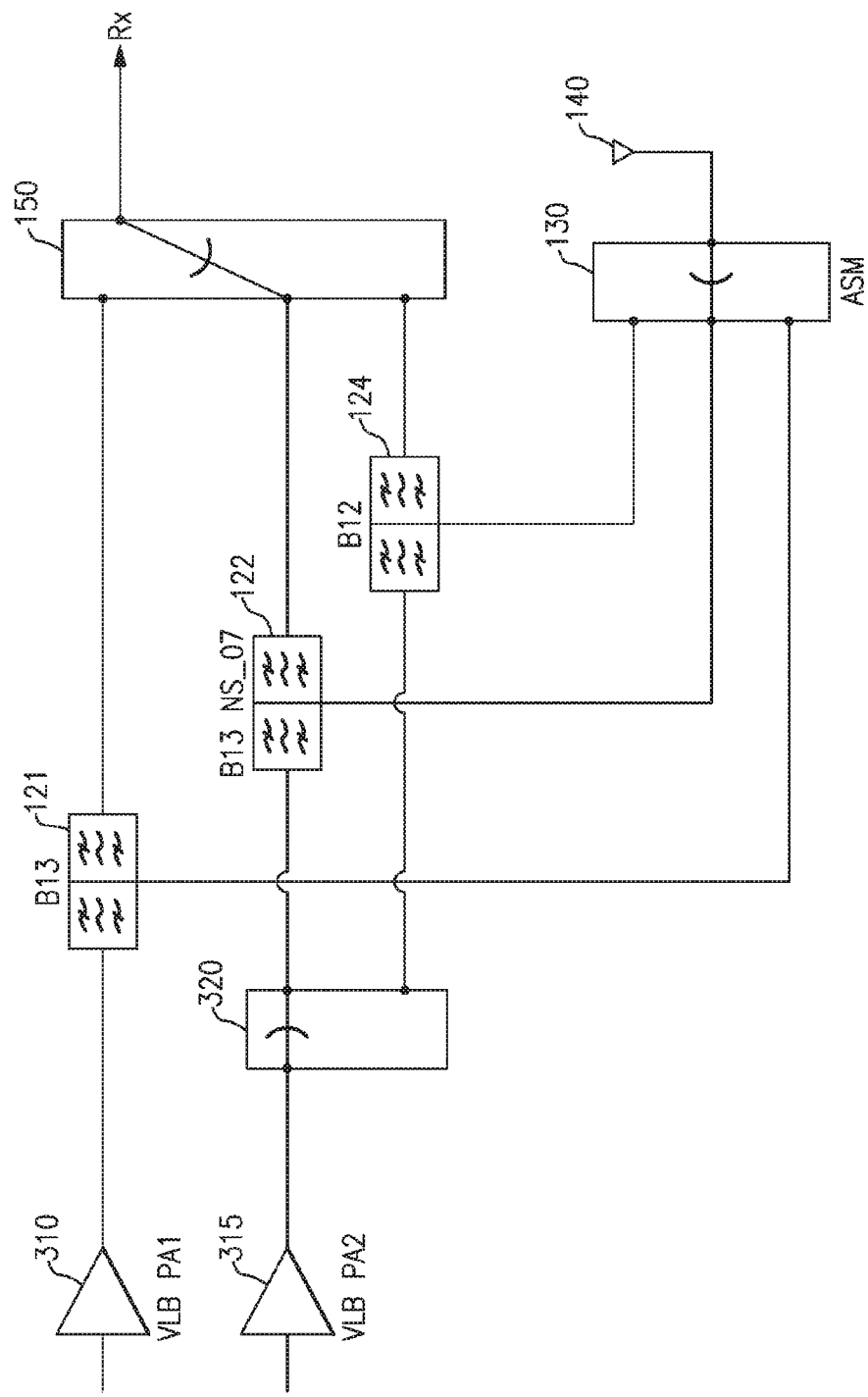

FRONT END ARCHITECTURE WITH FILTERS HAVING DIFFERENT OUT OF BAND ATTENUATION

CROSS-REFERENCE TO RELATED APPLICATIONS

This application is a divisional of U.S. patent application Ser. No. 14/821,041, filed Aug. 7, 2015 and titled "FRONT END ARCHITECTURE FOR INTERMITTENT EMISSIONS AND/OR COEXISTENCE SPECIFICATIONS," which is a non-provisional of and claims the benefit of priority under 35 U.S.C. § 119(e) of U.S. Provisional Patent Application No. 62/034,924, filed Aug. 8, 2014 and titled "FRONT END ARCHITECTURE FOR INTERMITTENT EMISSIONS AND/OR COEXISTENCE SPECIFICATIONS," and U.S. Provisional Patent Application No. 62/038,111, filed Aug. 15, 2014 and titled "FRONT END ARCHITECTURE FOR INTERMITTENT EMISSIONS AND/OR COEXISTENCE SPECIFICATIONS." The entire disclosures of U.S. patent application Ser. No. 14/821,041; U.S. Provisional Patent Application No. 62/034,924; and U.S. Provisional Patent Application No. 62/038,111 are hereby incorporated by reference in their entireties herein.

BACKGROUND

Technical Field

This disclosure relates to electronic systems and, in particular, to radio frequency (RF) circuits.

Description of the Related Technology

Cellular radio frequency transmission specifications typically specify particular linearity, emissions, power level, and modulation quality for nominal operating conditions. It can be desirable to achieve these specifications at a relatively high efficiency. Cellular radio frequency transmission specifications can also specify particular linearity, emissions, power level, and/or modulation quality for an intermittent signaling condition for a mobile device. Such intermittent signaling specifications can be associated with changing coexistence environments in and/or around the mobile device. Meeting worst case intermittent specifications can involve making tradeoffs in efficiency for nominal operating conditions. This can result in sub-optimal performance during typical operation.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is an apparatus that includes a first transmit path, a second transmit path, and a switch element. The first transmit path is configured to provide a first radio frequency (RF) signal in accordance with a nominal specification. The second transmit path is configured to provide a second RF signal in accordance with an intermittent specification, in which the first RF signal and the second RF signal are within the same transmit band. The switch element is coupled to both the first transmit path and the second path. The switch element is configured to provide the first RF signal as a transmit mode output in a first state and to provide the second RF signal as the transmit mode output in a second state.

The first transmit path can include a first transmit filter and the second transmit path can include a second transmit filter, in which the first transmit filter and the second transmit filter have approximately the same pass band. The second transmit filter can have a higher out of band attenuation than the first transmit filter. The second transmit filter can have a higher in band attenuation than the first transmit filter.

The first transmit path can be associated with a higher power added efficiency (PAE) than the second transmit path. The second transmit path can be associated with a higher linearity than the first transmit path. The first transmit path can have a lower insertion loss than the second transmit path. In an embodiment, the second transmit path can include a band pass filter and a notch filter.

The first transmit path can receive an RF signal from a first power amplifier and the second transmit path can receive a second RF signal from a second power amplifier. The first power amplifier can be configured to operate in envelope tracking mode and the second power amplifier can be configured to operate in average power mode. Alternatively, the apparatus can include a select switch configured to electrically couple an output of a power amplifier to a selected one of multiple throws of the select switch, in which the multiple throws of the select switch include at least a first throw electrically coupled to the first transmit path and a second throw electrically coupled to the second transmit path.

The transmit mode output of the switch element can be electrically coupled to an antenna port. The switch element can include a multi-throw radio frequency switch having at least a first throw and a second throw, in which the first throw is electrically coupled to the first transmit path and the second throw is electrically coupled to the second transmit path. The switch element can be, for example, a single pole multi-throw switch. According to some other implementations, the switch element can include multiple poles and multiple throws. The switch element can selectively couple one of the first transmit path, the second transmit path, or a third transmit path to an antenna port.

The intermittent specification can be, for example, an NS_07 specification. The nominal specification can be, for example, a Band 13 transmit specification. The transmit band can be from 777 MHz to 787 MHz in certain applications.

Another aspect of this disclosure is an apparatus that includes a first transmit filter, a second transmit filter, and a switch element. The first transmit filter has a pass band. The second transmit filter has approximately the same pass band as the first transmit filter. The second transmit filter has a higher out of band attenuation than the first transmit filter. The switch element is electrically coupled to both the first transmit filter and the second transmit filter.

The switch element can have at least a first throw electrically coupled to the first transmit filter and a second throw electrically coupled to the second transmit filter. The switch element can selectively electrically couple the second throw to an antenna port based at least partly on a signal indicative of an intermittent signaling mode. The apparatus can also include an antenna and the switch element can be configured to electrically couple a selected one of multiple throws to the antenna, in which the multiple throws including the first throw and the second throw.

The second filter can provide higher out of band and/or in band attenuation than the first transmit filter. The out of band attenuation of the second filter can be asymmetric about the pass band. The higher out of band attenuation of the second filter can be at frequencies below and/or above the pass band. The first transmit filter and the second transmit filter can be included in separate duplexers. Alternatively, the first transmit filter and the second transmit filter can be included in a co-packaged duplexer.

The apparatus can also include a first power amplifier in communication with the first transmit filter and a second power amplifier in communication with the second transmit filter. Alternatively, the apparatus can also include a power amplifier and a select switch configured to electrically couple an output of the power amplifier to a selected one of multiple throws, in which the multiple throws include at least a first throw electrically coupled to the first transmit filter and a second throw electrically coupled to the second transmit filter.

Another aspect of this disclosure is an electronically-implemented method that includes providing a radio frequency (RF) signal to an antenna, in which the radio frequency signal is within a specified frequency band; receiving a signal associated with an intermittent emissions specification; and responsive to said receiving, changing a state of a switch to cause a different RF signal in accordance with the intermittent emissions specification to be provided to the antenna, in which the different RF signal is within the specified frequency band.

The method can further include generating the different RF signal such that the different RF signal has a higher linearity than the RF signal.

For purposes of summarizing the disclosure, certain aspects, advantages and novel features of the inventions have been described herein. It is to be understood that not necessarily all such advantages may be achieved in accordance with any particular embodiment of the invention. Thus, the inventions may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

FIG. 3A is a schematic diagram of a front end architecture according to another embodiment.

DETAILED DESCRIPTION OF CERTAIN EMBODIMENTS

Figure 1A:
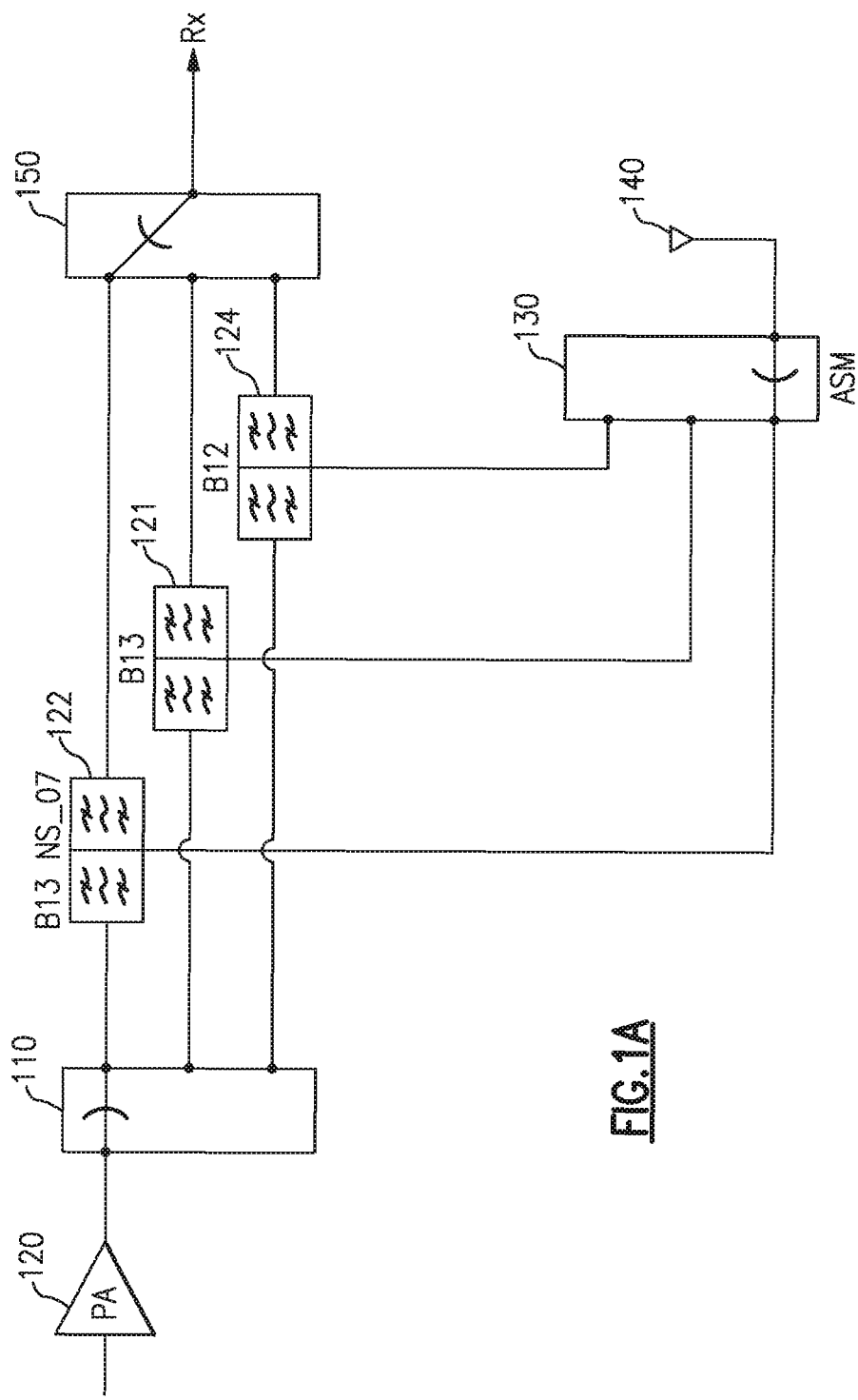
FIG. 1A is a schematic diagram of a front end architecture according to an embodiment.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Nominal operating conditions for cellular radio transmitters specify particular linearity, emissions, power level, and modulation quality. It can be desirable to achieve these specifications at a relatively high direct current (DC) efficiency. Intermittent emissions specifications may be signaled by a network. For instance, a base station can send a mobile device a signal to enter the intermittent emission specification mode. This can be due to changing coexistence environments in and/or around the handset. In order to meet a worst case intermittent specification, tradeoffs in DC current efficiency to achieve target linearity and/or out-of-band emissions specifications may be made. Previous solutions to meet the worst case intermittent specification have penalized nominal operating conditions, such as DC current consumption and/or insertion loss, that are present most of the time at the expense of meeting the worst case intermittent specification. This can result in sub-optimal performance during typical operation.

Aspects of this disclosure relate to meeting intermittent specifications while maintaining relatively high performance for typical operation. This disclosure provides example embodiments for meeting specifications for typical Band 13 operation and an intermittent network signaling specification for NS_07 emissions. NS_07 requirements concern the public safety band that can be used by firefighters, police, etc. In Long-Term Evolution (LTE) standards, a transmit band for Band 13 is adjacent to the NS_07 band. There are strict specifications for interference with NS_07 transmissions. When operating in the transmit band of Band 13 (777-787 MHz), the NS_07 special case can be signaled by the network. When the NS_07 special case is signaled, the specification calls for the handset to lower its emissions to meet a spectrum emission of less than −57 dBm/6.25 kHz at the antenna in the public safety band (769-775 MHz). This can protect the public safety band. The NS_07 public safety band is only about 2 MHz away from the Band 13 transmit band. The proximity of the NS_07 public safety band to the Band 13 transmit band presents technical problems. For instance, increasing filter attenuation significantly to prevent interference between the transmit band for Band 13 and the NS_07 public safety band can increase insertion loss and DC operating current for typical operation.

The NS_07 specification specifies significantly more out of band attenuation in a transmit path for Band 13 than for a nominal mode Band 13 transmit operation. This increased out of band attenuation can be implemented by a duplexer disposed between a power amplifier and an antenna switch module. However, a filter with increased out of band attenuation can also increase insertion loss in the transmit path for Band 13. Because the NS_07 mode typically occurs only a small percentage of the time (for example, about 1% of the time or less), a solution that preserves nominal transmit DC current consumption during typical operation while meeting the NS_07 specification is desirable.

In this disclosure, dedicated RF paths are provided for typical transmission in Band 13 and for transmitting in Band 13 while meeting the emissions specification for the NS_07 public safety band. One path can be implemented for the nominal operating condition, such as transmitting a typical Band 13 signal, at a relatively high efficiency and another path can be implemented for an intermittent case, such as the NS_07 case, with higher linearity and/or out of band filter attenuation. One of the two paths can be selected based on whether or not the intermittent case is signaled. This can enable a difficult, intermittent emissions specification to be met at the penalty of higher DC current consumption and thus lower efficiency during the intermittent mode, without incurring a similar penalty during typical operation. Accordingly, intermittent emissions specifications and/or coexistence specifications can be met while maintaining a relatively high level of performance, such as DC current consumption, during typical operations.

The principles and advantages discussed herein can be applied to a variety of applications in mobile devices, such as cellular phones. Generally, the principles and advantages discussed herein can be applied where significantly tougher emissions performance is desired intermittently, but not all the time.

One application of the principles and advantages discussed herein is where there are intermittent emissions amongst radios within a single mobile device (e.g., a single handset). This can be referred to as self de-sense coexistence. For example, while a mobile phone is facilitating a Long Term Evolution (LTE) call in Band 41 (in a frequency range from 2496 MHz to 2690 MHz), a 2.4 GHz Wi-Fi connection can be started (in a frequency range from 2403 MHz to 2483 MHz). In this example, it can be desirable to reduce emissions from the Band 41 transmission into the 2.4 GHz Wi-Fi upper frequency channels. Absent such a reduction in emissions, the mobile device can de-sense its own Wi-Fi reception. As another example, a Band 12 operation may be carrier aggregated with a secondary receive channel in Band 4. The third harmonic of Band 12 is typically not a concern when operating on its own, but with a Band 12 transmit/receive primary channel adding the secondary Band 4 receive channel, it may be desirable to attenuate the third harmonic of Band 12 up to about 100 dB from its amplitude at a power amplifier output (e.g., a collector of a bipolar power amplifier transistor) so it does not interfere with the Band 4 receive path. As one more example, a mobile device operating in Band 13 can have a second harmonic that is near a Global Position System (GPS) frequency band. If GPS is not operating, the suppression of a second harmonic of Band 13 may not be of much concern. However, when GPS is active, filtering out the second harmonic of Band 13 can have a significant impact on improving performance.

Another application of the principles and advantages discussed herein is when there is interference from the environment around the mobile device. For instance, when a mobile device is being used in a crowd, mobile devices of other nearby users can cause interference. Alternatively or additionally, a network interference environment can change and the mobile device can suddenly be immersed in an interfering situation in the cell. A base station (e.g., an Evolved Node B [eNodeB]) may direct the mobile device to perform in more stringent specifications to better to manage a temporary coexistence issue.

Another application of the principles and advantages discussed herein is in network signaling cases. For example, the LTE standard provides a number of network signaling cases. Table 1 below includes information regarding network signaling cases where stringent emissions are imposed on specific RF paths and band support in user equipment (UE) in the LTE cellular communications standard. Such cases include the following Network Signaled (NS) cases, which can be for a geographical region to protect local wireless services, for public safety, for covering areas that are occupied geographically by digital television co-existence specifications, etc. The frequency bands in Table 1 correspond to E-UTRA (Evolved Universal Terrestrial Radio Access) operating bands of LTE. Some of these NS cases are for protecting a victim band. Some other NS cases below are related to spectral masks. The principles and advantages discussed herein can be applied to any of the NS cases in Table 1 below. The principles and advantages discussed herein can be applied to other NS cases that specify tougher emissions standards than in nominal cases.

TABLE 1

Network Signaling Cases

| NS Case | E-UTRA Band | Channel BW [MHz] | Basis for NS | Emissions Type |
|---|---|---|---|---|
| NS_01 | ALL | 1.4, 3, 5, 10, 15, 20 | Spectral Regrowth | Spectral Mask |
| NS_03 | B2, B4, B10, B23, B25, B35, B36 | 3, 5, 10, 15, 20 | US FCC Emissions | Spectral Mask |
| NS_04 | B41 | 5 10, 15, 20 | US FCC Emissions | Spectral Mask |
| NS_05 | B1 | 10, 15, 20 | PHS Rx | Protect Band |
| NS_06 | B12, B13, B14, B17 | 1.4, 3, 5, 10 | US FCC Emissions | Spectral Mask |
| NS_07 | B13 | 10 | Public Safety | Public Safety |
| NS_08 | B19 | 10, 15 | B18/B19 Rx | |
| NS_09 | B21 | 10, 15 | B11 Rx | Protect Band |
| NS_10 | B20 | 15, 20 | B20 Rx | Protect Band |
| NS_11 | B23 | 1.4, 3, 5, 10, 15, 20 | Block H (B25 Ext Rx) | Protect Band/ Spectral Mask |
| NS_12 | B26 | 1.4, 3, 5, 10, 15 | Public Safety | Protect Band |
| NS_13 | B26 | 5 | Public Safety | Protect Band |
| NS_14 | B26 | 10, 15 | Public Safety | Protect Band |
| NS_15 | B26 | 1.4, 3, 5, 10, 15 | Public Safety | Protect Band |
| NS_16 | B27 | 3, 5, 10 | B28 Rx | Protect Band |
| NS_17 | B28 | 5, 10 | Japan DTV | Protect Band |
| NS_18 | B28 | 5, 10, 15, 20 | DTV | Protect Band |
| NS_19 | B44 | 10, 15, 20 | DTT-TV | Protect Band |
| NS_20 | B23 | 5, 10, 15, 20 | | Protect Band/ Spectral Mask |
| NS_21 | B30 | 10, 15 | SDARS/XM Radio | Spectral Mask |
| NS_22 | B42/B43 | 1.4, 3, 5, 10, 15 | B43/B42 TDD Rx | Spectral Mask |
| NS_23 | B42/B43 | 5, 10 | B43/B42 TDD Rx | Spectral Mask |

FIG. 1A is a schematic diagram of a front end architecture according to an embodiment. The front end architecture of FIG. 1A can transmit and receive RF signals. An RF signal can have a frequency in the range from about 30 kHz to 300

GHz, such as in a range from about 450 MHz to about 4 GHz for radio frequency signals in LTE systems. In FIG. 1A, a dedicated transmit path is provided to address a particular emission specification, such as an intermittent and/or relatively rare occurrence emission, and a separate path can be provided for typical operation. The transmit path for typical operation can have better DC performance than the dedicated transmit path for the particular emission specification. The dedicated path can be switched in to address the particular emissions specification, while another path can be switched in for typical operation. This can avoid significantly sacrificing performance during typical operation to meet the particular emissions specification. In the front end architecture illustrated in FIG. 1A, the particular emissions specification is the NS_07 specification and typical operation is a Band 13 transmission.

The front end architecture illustrated in FIG. 1A includes a transmit select switch 110, a power amplifier 120, a first duplexer 121, a second duplexer 122, a third duplexer 124, an antenna switch module 130, an antenna 140, and a receive select switch 150. In some other embodiments, the front end architecture of FIG. 1A and/or any of the other illustrated embodiments can include more or fewer elements than illustrated.

The transmit select switch 110 can couple an output of the power amplifier 120 to a selected duplexer. The transmit select switch 110 can be an RF switch. The transmit select switch 110 can be a multi-throw switch, such as a single pole multi-throw switch as illustrated. The transmit select switch 110 can couple an output of the power amplifier 120 to a selected one of multiple throws. The multiple throws can include a first throw electrically coupled to a first duplexer 121 configured for typical operation and a second throw electrically coupled to a second duplexer 122 configured to meet the particular emissions specification. The transmit select switch 110 can selectively electrically couple the output of the power amplifier 120 to one of the multiple throws based at least partly on a signal indicative of the intermittent emissions specification. The signal indicative of the intermittent emissions specification can be received by way of the antenna 140. The transmit select switch 110 can include one or more other throws associated with different frequency bands and/or different modes of operation. For instance, as illustrated, the transmit select switch 110 includes a third throw electrically coupled to the third duplexer 124. In FIG. 1A, the third duplexer 124 is arranged for band 12 transmission and receiving.

The second duplexer 122 can have one or more different characteristics than the first duplexer 121. For instance, the second duplexer 122 can provide a higher out of band attenuation in a transmit path than the first duplexer 121. The higher out of band attenuation provided by the second duplexer 122 can be symmetric or asymmetric outside of the pass band. In some instances, an increased attenuation on one side of the pass band can be sufficient to comply with an intermittent emissions specification. For instance, a public safety band associated with the NS_07 specification is about 2 MHz below the transmit band for Band 13. Accordingly, a higher out of band attenuation at frequencies below the pass band for the second duplexer 122 can be sufficient in such an application without having a higher out of band attenuation at frequencies above the pass band. In some other applications, such a duplexer can provide higher out of band attenuation at frequencies above the pass band or higher out of band attenuation at frequencies above and below the passband. As another example, the second duplexer 122 can provide a higher in band attenuation than the transmit filter of the first duplexer 121. As illustrated, the first duplexer 121 provides a transmit filter for a typical Band 13 transmission and the second duplexer 122 provides a transmit filter for a Band 13 transmission that is compliant with the NS_07 specification. The transmit filter of the first duplexer 121 and the transmit filter of the second duplexer 122 can be band pass filters having the same pass band, in which the transmit filter of the second duplexer 122 has a higher out of band attenuation than the transmit filter of the first duplexer 121. The transmit filter of the first duplexer 121 can have the different characteristics than the transmit filter of the second duplexer 122, as discussed above.

Figure 1B:
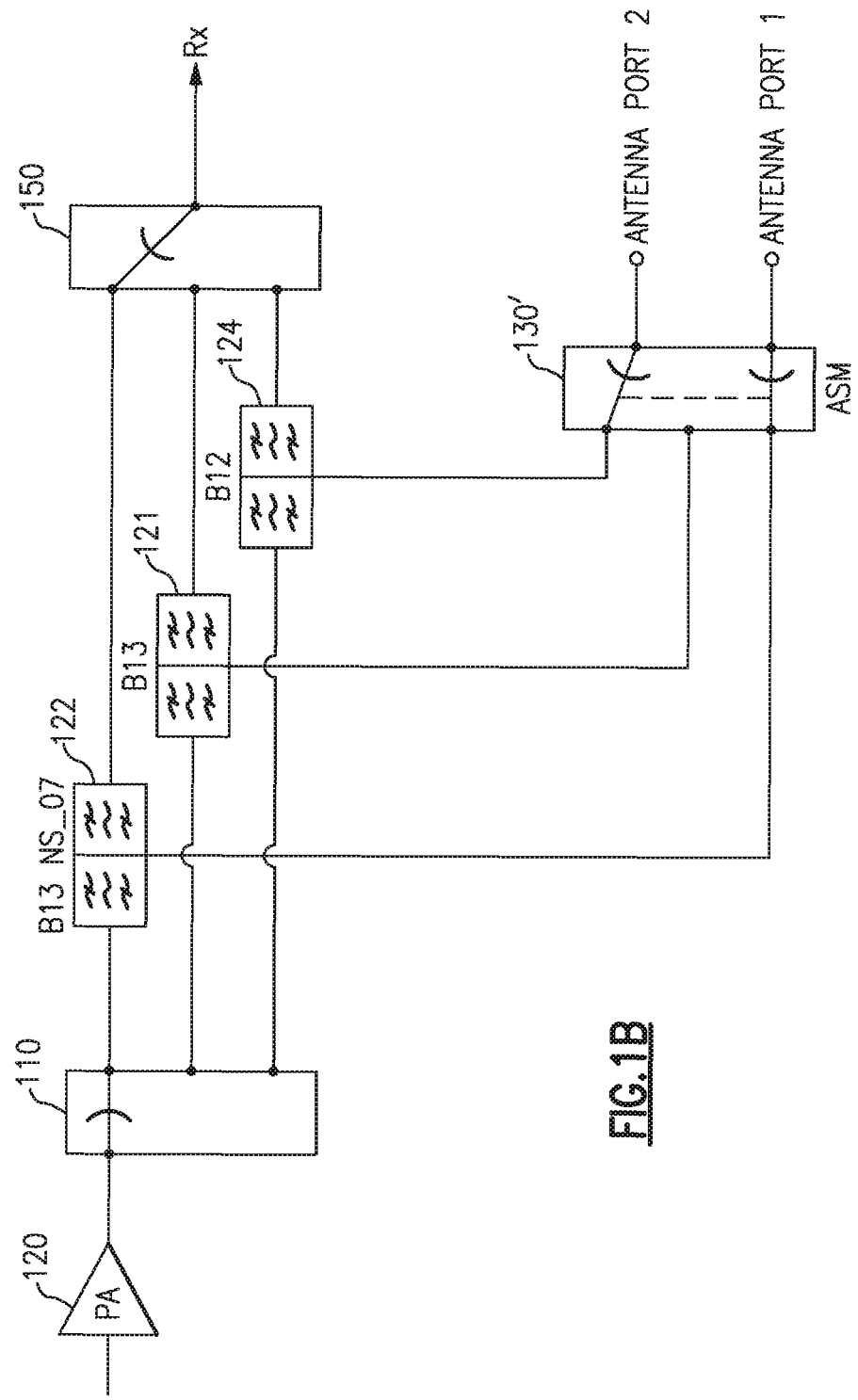
FIG. 1B is a schematic diagram of a front end architecture according to an embodiment.
Figure 1C:
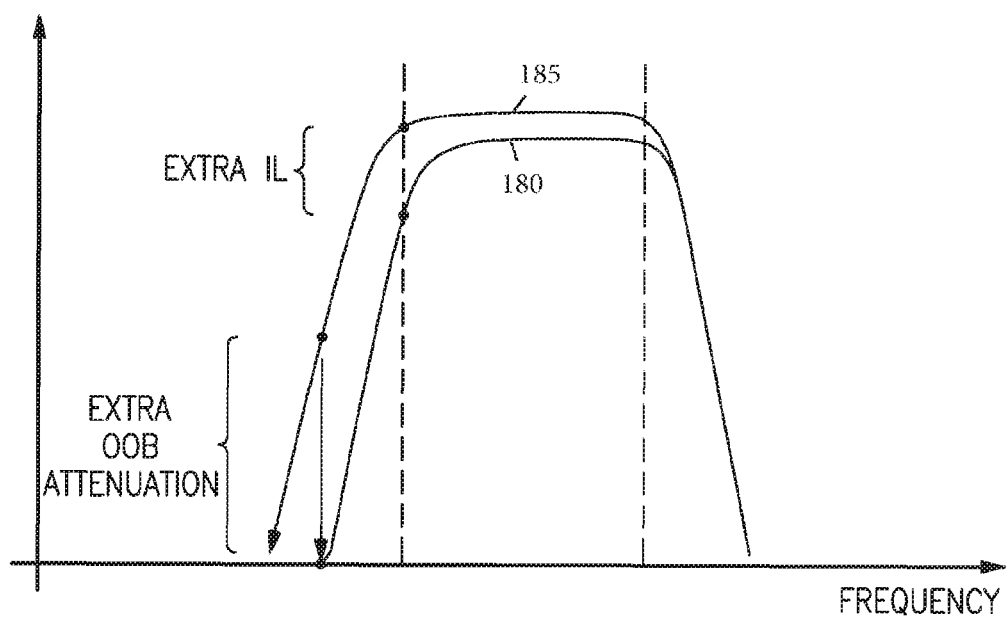
FIG. 1C is a graph of frequency responses for filters in two of the transmit paths of FIG. 1A.

FIG. 1C is a graph of frequency responses for filters in two of the transmit paths of FIG. 1A according to an embodiment. In FIG. 1C, a first curve 180 illustrates a frequency response of a transmit filter in the second duplexer 122 of FIG. 1A and a second curve 185 illustrates a frequency response of a transmit filter in the first duplexer 121 of FIG. 1A. Both of these transmit filters are band pass filters having approximately the same pass band. The curves 180 and 185 illustrate that the transmit filter in the second duplexer 122 has a higher in band attenuation than the transmit filter in the first duplexer 121. Accordingly, the second duplexer 122 should add more insertion loss (IL) than the first duplexer 121. In addition, the curves 180 and 185 illustrate that the transmit filter in the second duplexer 122 has a higher out of band (OOB) attenuation than the transmit filter in the first duplexer 121 below the pass band.

Referring back to FIG. 1A, the antenna switch module 130 can selectively electrically couple one of the first duplexer 121 or the second duplexer 122 to the antenna 140. One or more additional elements can be disposed between the antenna switch module 130 and the antenna 140 in certain applications. The illustrated antenna switch module 130 is configured for bidirectional communication between a selected duplexer and the antenna 140. In transmit mode, the antenna switch module 130 is configured to provide an RF signal from a selected duplexer to the antenna 140. The output of the antenna switch module 130 in transmit mode provides the selected RF signal to the antenna 140 in the embodiment of FIG. 1A. In receive mode, the antenna switch module 130 is configured to provide an RF signal from the antenna 140 to a selected duplexer. The output of the antenna switch module 130 in receive mode provides the selected RF signal to the selected duplexer in the embodiment of FIG. 1A.

The antenna switch module 130 includes a switch element configured to selectively provide an RF signal from a selected transmit path as an output of the switch element in transmit mode. As illustrated, the switch element is a single pole multi-throw switch. In other embodiments, the switch element can include two or more switches. The two or more switches can be configured for transmitting signals. The two or more switches can include separate switches for transmitting signals and receiving signals from the antenna 140. The switch element can provide an output to one or more antennas in transmit mode. For instance, the switch element can provide an output to a single antenna 140 as illustrated in FIG. 1A. In other instances, the switch element can provide the output to an antenna that includes multiple antenna elements. According to some implementations, the switch element can provide RF signals from different paths, such as the Band 13 path and the NS_07 Band 13 path illustrated in FIG. 1A, to different respective antennas in transmit mode.

The antenna switch module 130 can selectively electrically couple a selected one of any suitable number of transmit paths to the antenna in transmit mode. As illustrated, the antenna switch module 130 can selectively provide an RF signal from one of the first duplexer 121, the second duplexer 122, or a third duplexer 124 to the antenna 140 in transmit mode. In a first state, the switch element can provide a first RF signal from the first duplexer 121 as a transmit mode output. In a second state, the switch element can provide a second RF signal from the second duplexer 122 as the transmit mode output. In a third state, the switch element can provide a third RF signal from the third duplexer 124 as the transmit mode output.

The antenna switch module 130 can include a switch having at least a first throw electrically coupled to the first duplexer 121 and a second throw electrically coupled to the second duplexer 122. The antenna switch module 130 can electrically couple a selected throw of multiple throws, including at least the first throw and the second throw, to the antenna 140. Accordingly, the antenna switch module 130 can selectively electrically couple either a path for typical Band 13 operation or a path for NS_07 compliant Band 13 operation to the antenna 140. The antenna switch module 130 can also selectively electrically couple other paths to the antenna, such as a band 12 path shown in FIG. 1A. The switch in the antenna switch module 130 can be a multi-throw switch, such as a single pole multi-throw switch as illustrated. The switch in the antenna switch module 130 can be a bidirectional switch as illustrated.

In another embodiment, a switch, such as a single pole double throw switch, can selectively electrically couple either the first duplexer 121 or the second duplexer 122 to an antenna switch module.

The front end module illustrated in FIG. 1A includes a receive select switch 150 having a first throw electrically coupled a receive filter in the first duplexer 121 and a second throw electrically coupled a receive filter in the second duplexer 122. The receive select switch 150 can include additional throws electrically coupled to other duplexers, such as the third duplexer 124, associated with other bands of operation. Alternatively, a receive select switch can be coupled to the receive path via another switch that can select between coupling the first duplexer 121 or the second duplexer 122 to a receive select switch.

A packaged module can include the power amplifier 120, the transmit select switch 110, the duplexers 121 and 122, and the receive select switch 150 of FIG. 1A or any of functionally similar elements of any of the other embodiments discussed herein. The packaged module can include a package enclosing the power amplifier 120, the transmit select switch 110, the duplexers 121 and 122, and the receive select switch 150. Such packaged modules can be configured to use in mobile devices, such as mobile phones (e.g., smart phones). In certain embodiments, a packaged module can include the power amplifier 120, the transmit select switch 110, the duplexers 121 and 122, the receive select switch 150, and the antenna switch module 130.

FIG. 1B is a schematic diagram of a front end architecture according to an embodiment. FIG. 1B shows that an antenna switch module 130' can include a multi-pole, multi-throw switch element. As illustrated, the antenna switch module 130' includes a first pole corresponding to a first antenna port ANTENNA PORT 1 and a second pole corresponding to a second antenna port ANTENNA PORT 2. Accordingly, the antenna switch module 130' can provide RF signals to multiple antennas. The antenna switch module can also receive RF signals from multiple antennas. In an embodiment, the antenna switch module 130' can selectively provide RF signals to a primary antenna and a diversity antenna.

According to certain embodiments, the antenna switch module 130' can provide an RF signal from a selected transmit path to a selected antenna while providing an RF signal received from another antenna to a selected receive path. While illustrated the antenna switch module 130' includes two poles, the principles and advantages discussed herein can be applied to switch elements having three or more poles. Similarly, such the antenna switch elements discussed herein can have any suitable number of throws.

Figure 2A:
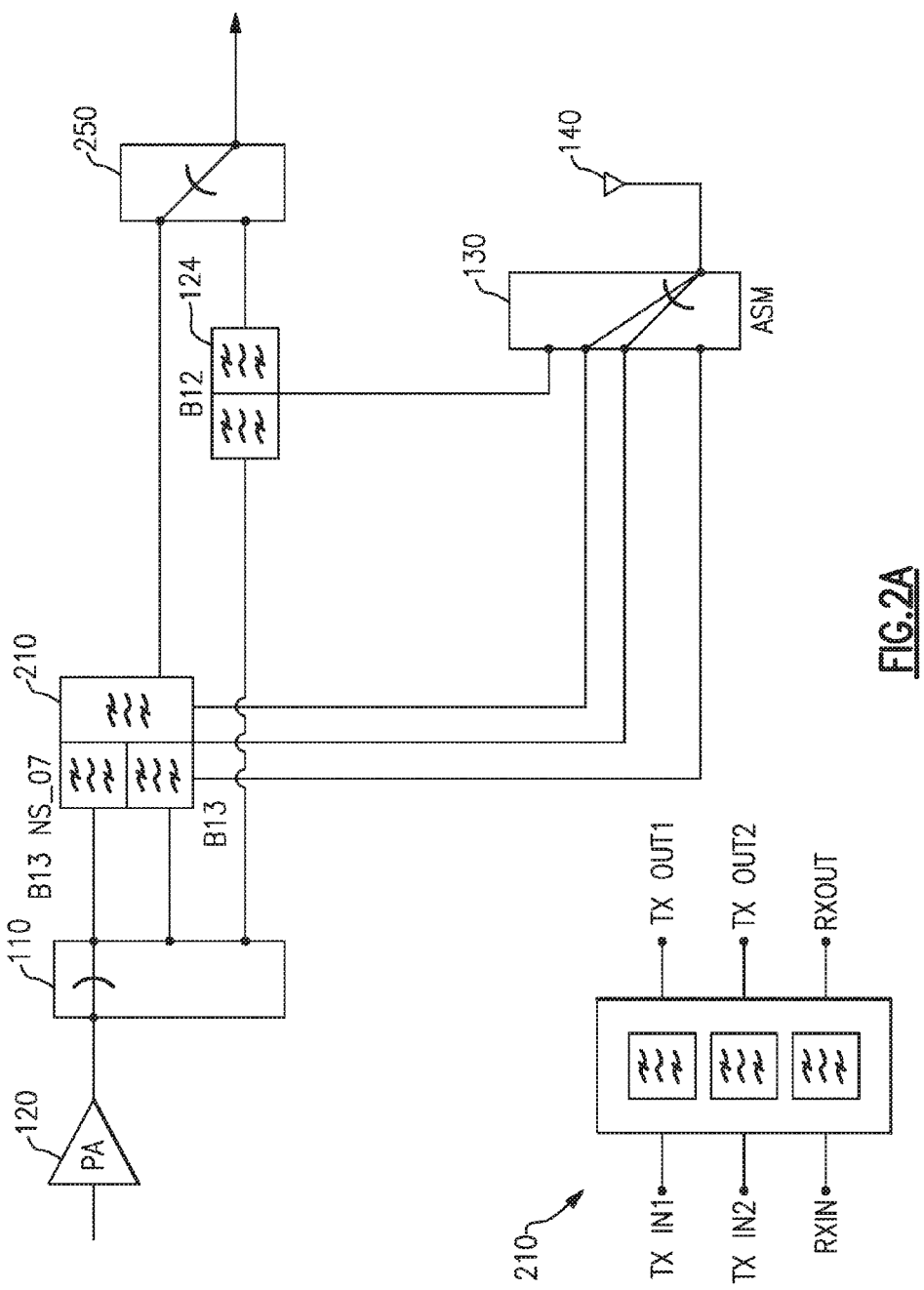
FIG. 2A is a schematic diagram of a front end architecture according to another embodiment.

FIG. 2A is a schematic diagram of a front end architecture according to another embodiment. In the embodiment of FIG. 2A, the first and second duplexers 121 and 122, respectively, of FIG. 1A can be combined as a co-packaged duplexer 210. The co-packaged duplexer 210 can reduce cost and size relative to the separate first and second duplexers 121 and 122, respectively, of FIG. 1A. The relative cost and size reductions can result from co-packaging and/or eliminating a receive filter. The co-packaged duplexer 210 can have three input ports TX IN1, TX IN2, and RXIN and three output ports TX OUT1, TX OUT2, and RXOUT. The illustrated co-packaged duplexer 210 includes two transmit filters and a single receive filter. As shown in FIG. 2A, the co-packaged duplexer 210 can include a first transmit filter configured for typical Band 13 transmissions, a second transmit filter configured for NS_07 mode, and a receive filter. These transmit filters can be band pass filters having the same pass band. The first transmit filter can be configured for relatively low insertion loss in the pass band and can result in relatively high power added efficiency (PAE). The second transmit filter can be configured to meet NS_07 emissions specifications. The second transmit filter can provide more insertion loss and less efficiency than the first transmit filter, but offer a better attenuation of frequencies in the NS_07 public safety band. The second transmit filter can provide higher out-of-band attenuation and/or higher in band attenuation than the first transmit filter. As shown in FIG. 2A, the receive filter of the co-packaged duplexer can process signals received from the antenna 140 using the same filter for both typical Band 13 receive mode and NS_07 receive mode. Accordingly, a receive select switch 250 can have one less throw than the receive select switch 150 of FIG. 1A.

The antenna switch module 130 illustrated in FIG. 2A has one more throw than the antenna switch module illustrated FIG. 1A. Three separate traces or other electrical connections can electrically connect three throws of antenna switch module 130 to respective ports of the co-packaged duplexer 210. The antenna switch module 130 can implement a switch combining functionality to selectively electrically connect an antenna port to the receive filter and one of the transmit filters. As shown in FIG. 2A, two throws of the antenna switch module 130 can be active simultaneously such that the receive filter of the co-packaged duplexer 210 and one of the transmit filters of the co-packaged duplexer 210 can be coupled to the antenna 140 at a time. In one state, the antenna switch module 130 of FIG. 2A can electrically couple a first transmit filter of the co-packaged duplexer 210 and the receive filter of the co-packaged duplexer 210 to an antenna port. In another state, the antenna switch module 130 of FIG. 2A can electrically couple a second transmit filter of the co-packaged duplexer 210 and the receive filter of the co-packaged duplexer 210 to the antenna port.

Figure 2B:
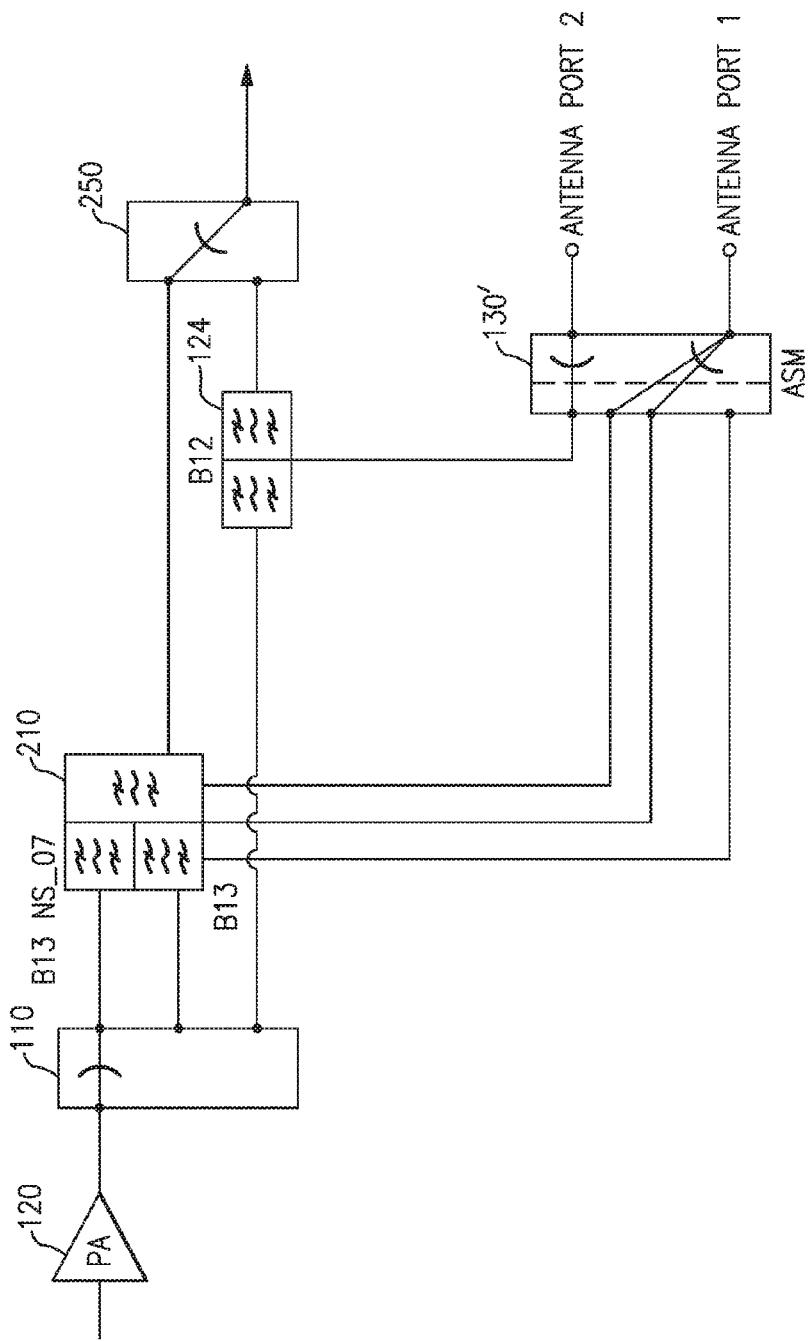
FIG. 2B is a schematic diagram of a front end architecture according to another embodiment.

FIG. 2B is a schematic diagram of a front end architecture according to an embodiment. FIG. 2B shows that an antenna switch module 130' can include a multi-pole, multi-throw switch element and can selectively provide an RF signal to various antenna ports. The features of FIG. 2B can be implemented in connection with any of the principles and advantages discussed herein.

FIG. 3A is a schematic diagram of a front end architecture according to another embodiment. The front end architecture illustrated in FIG. 3A includes a first power amplifier 310, a second power amplifier 315, a first duplexer 121, a second duplexer 122, a third duplexer 124, a select switch 320, an antenna switch module 130, an antenna 140, and a receive select switch 150.

In the embodiment of FIG. 3A, two different power amplifiers are implemented. The first power amplifier 310 can be configured for typical operation and the second power amplifier 315 can be configured for meeting a particular emissions specification. One of these two power amplifiers may be disabled while the other of these power amplifiers is enabled. These power amplifiers can be configured to amplify RF signals in the same transmit frequency band (e.g., in Band 13). The first power amplifier 310 can provide an output to the first duplexer 121 without adding an insertion loss from an RF switch. The first duplexer 121 can be a relatively low loss duplexer arranged to meet standard emissions specifications. When a signal received from a network indicates that the radio transmitter should meet the particular emissions specification, such as the NS_07 emissions specification, a transmit path coupled to the second power amplifier 315 can be selected. The second power amplifier 315 can be configured for compliance with the particular emissions specification. The output of the second power amplifier 315 can be provided to the second duplexer 122 via a select switch 320. A second duplexer 122 that includes a transmit filter having a higher insertion loss in the pass band and/or a higher out of band attenuation relative to a transmit filter in the first duplexer 121 can be switched in to meet the particular emissions specification. This can result in a less desirable DC current consumption associated with an intermittent signaling specification (e.g., NS_07), but this penalty may only be incurred in the intermittent signaling mode (e.g., NS_07 mode).

Power amplifiers can be operated in an envelope tracking (ET) mode with a modulated power supply or an average power tracking (APT) mode with a fixed power supply. It can be difficult to configure a power amplifier to perform optimally in both ET mode and APT mode. In one embodiment, two separate power amplifiers can be implemented. A first of these power amplifiers can be configured to achieve a maximum power in APT mode for a desired linearity for NS_07 operation. A second of these power amplifiers can be configured to achieve a desired efficiency in ET mode for typical operation. A transmit module can receive a programming bit to indicate whether to operate in ET mode or APT mode. The programming bit can be used to select either a first path including the first power amplifier or a second path including the second power amplifier. Since this programming bit may be included anyway in certain application, no additional data may be needed to select between the first path for typical operation and the second path for the NS_07 operating condition. This can make implementation of the separate paths transparent to outside of the transmit module.

According to certain embodiments, the first power amplifier 310 can be configured to operate in an ET mode and the second power amplifier 315 can be configured to operate in an APT mode. In general, the first power amplifier 310 can be configured for relatively higher efficiency and the second power amplifier 315 can be configured for relatively higher linearity.

Figure 3B:
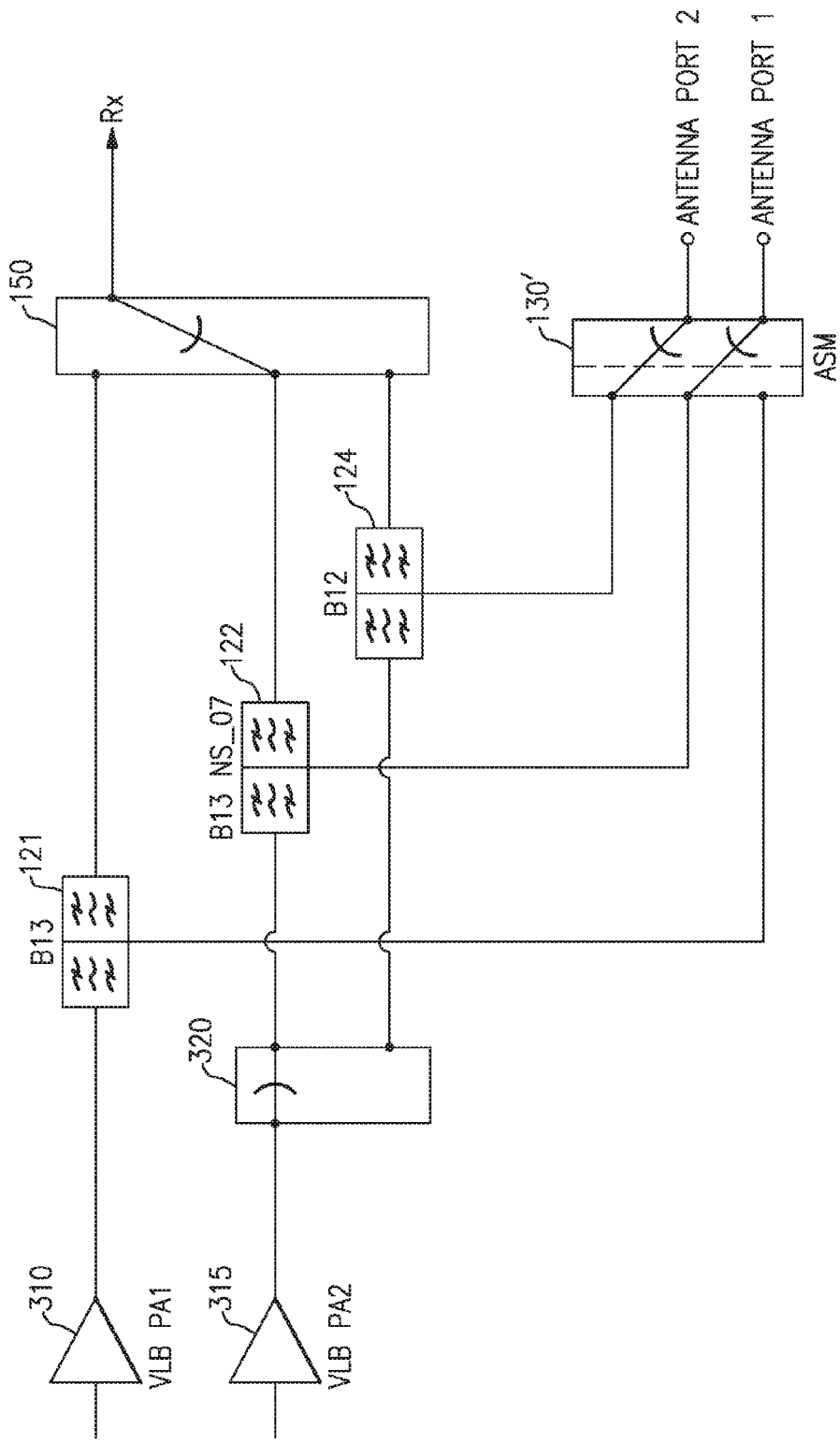
FIG. 3B is a schematic diagram of a front end architecture according to another embodiment.

FIG. 3B is a schematic diagram of a front end architecture according to an embodiment. FIG. 3B shows that an antenna switch module 130' can include a multi-pole, multi-throw switch element and can selectively provide an RF signal to various antenna ports. The features of FIG. 3B can be implemented in connection with any of the principles and advantages discussed herein.

Figure 4A:
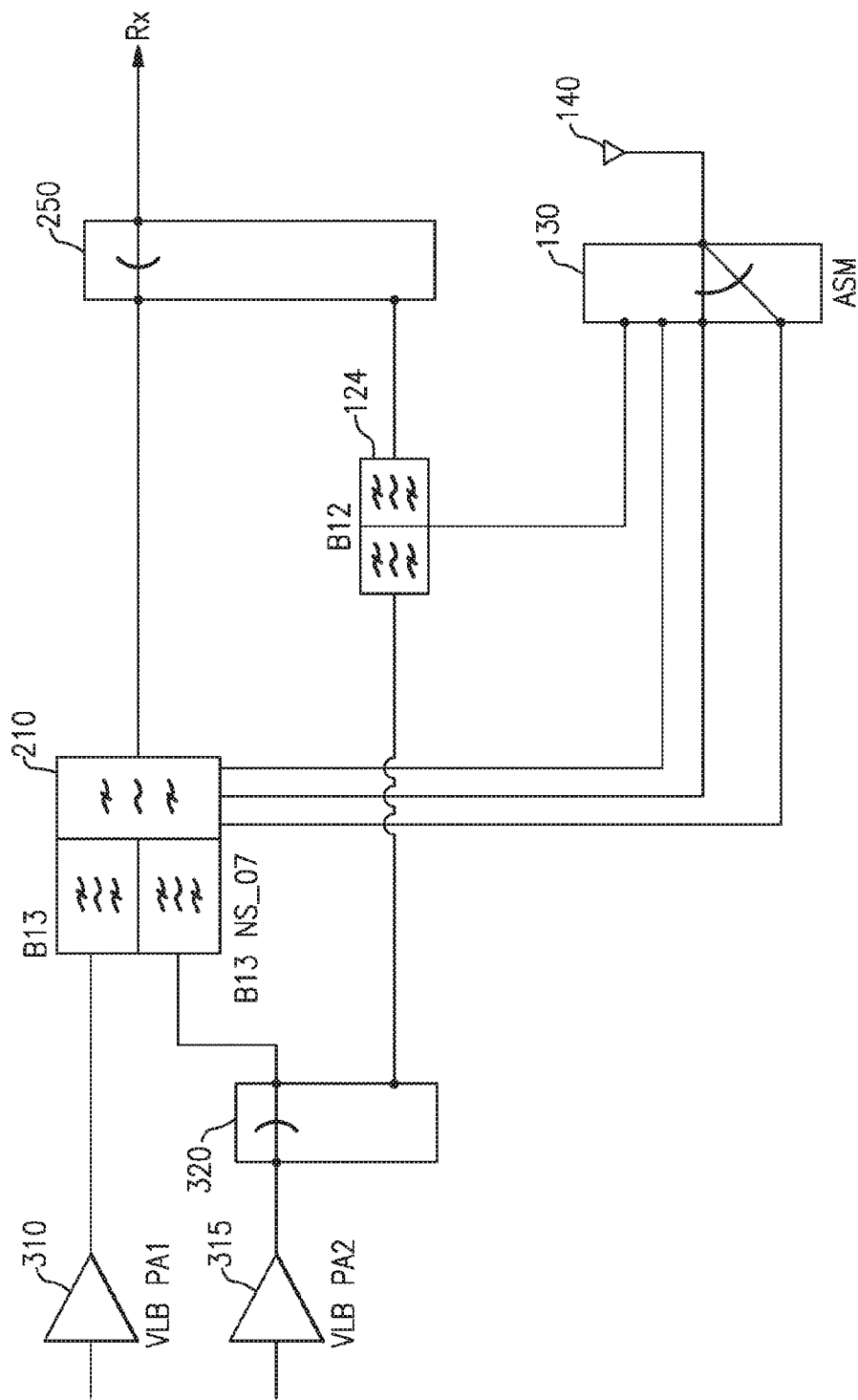
FIG. 4A is a schematic diagram of a front end architecture according to another embodiment.

FIG. 4A is a schematic diagram of a front end architecture according to another embodiment. In the embodiment of FIG. 4A, the first and second duplexers 121 and 122, respectively, of FIG. 3 can be combined as a co-packaged duplexer 210. The co-packaged duplexer 210 can include any combination of features discussed with reference to FIGS. 2A and/or 2B. The receive paths for the embodiment of FIG. 4A can implement any combination of features of the receive paths of FIGS. 2A and/or 2B, such as the receive select switch 250.

In another embodiment (not illustrated), the output of the first transmit filter of the co-packaged duplexer 210 of FIG. 2A and the output of the second transmit filter of the co-packaged duplexer 210 can be provided to the same transmit input of the antenna switch module 130. According to some such embodiments, the power amplifiers 310 and 315 of FIG. 4A can be electrically connected to the different transmit filters of the co-packaged duplexer 210 and one of the power amplifiers 310 and 315 can be deactivated while the other of these power amplifiers is activated. Accordingly, the one transmit filter of the co-packaged duplexer 210 that receives an output of an activated power amplifier can provide an RF output to the transmit input of the antenna switch module 130. This can reduce the number of throws in a switch of the antenna switch module 130 by one throw relative to the embodiment of FIG. 2A or the embodiment of FIG. 4A.

Figure 4B:
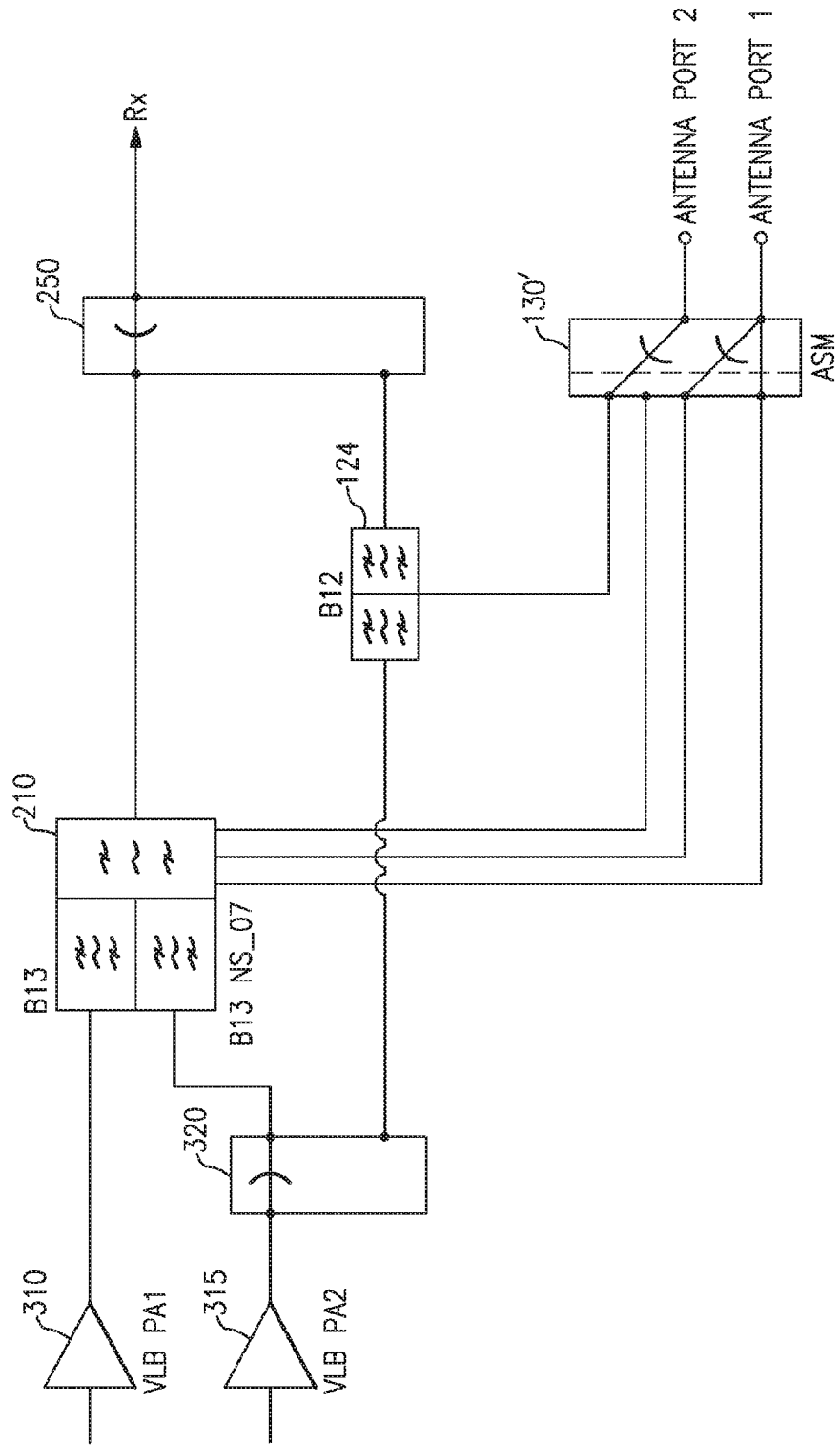
FIG. 4B is a schematic diagram of a front end architecture according to another embodiment.

FIG. 4B is a schematic diagram of a front end architecture according to an embodiment. The front end architecture of FIG. 4B is like the front end architecture of FIG. 4A except that the antenna switch module 130' includes a multi-pole, multi-throw switch element that can selectively provide an RF signal to various antenna ports. The features of FIG. 4B can be implemented in connection with any of the principles and advantages discussed herein.

Figure 5A:
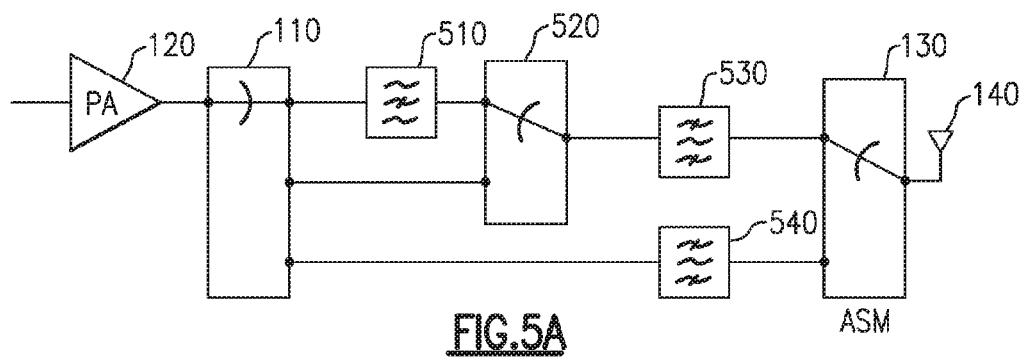
FIG. 5A to 5C are schematic diagrams of front end architectures according to various embodiments, in which a particular transmit path includes a notch filter.
Figure 5B:
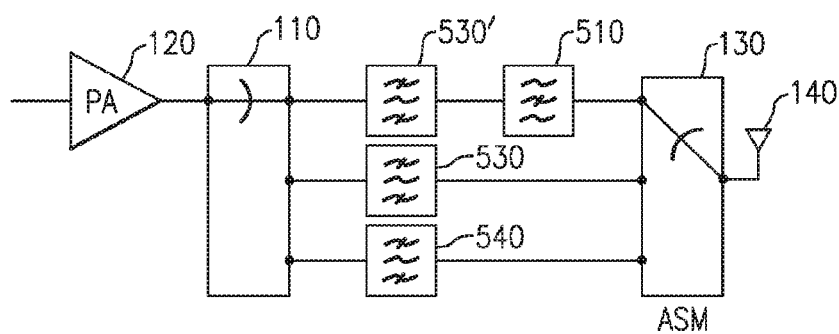
Figure 5C:
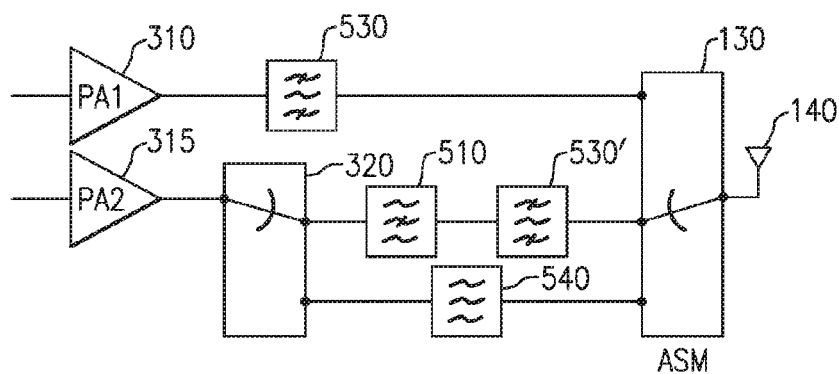

FIGS. 5A to 5C are schematic diagrams of front end architectures according to various embodiments, in which a particular transmit path includes a notch filter. In these embodiments, a dedicated transmit path that includes a notch filter is provided to address an intermittent and/or relatively rare occurrence emission and a separate path is provided for typical operation. While the front end architectures illustrated in FIGS. 5A to 5C illustrate transmit paths, any of these architectures can also include receive paths. For instance, any of the illustrated filters can be implemented in a duplexer and/or a co-packaged duplexer. Any of the principles and advantages discussed with reference to FIGS. 5A to 5C can be implemented in connection with any of the principles and advantages discussed with reference to any of the other embodiments. Any suitable combination of features of FIGS. 5A to 5C can be implemented in combination with each other.

The front end architecture illustrated in FIG. 5A includes a transmit select switch 110, a power amplifier 120, a notch filter 510, a select switch 520, band pass filters 530 and 540, an antenna switch module 130, an antenna 140. The transmit select switch 110 and select switch 520 can selectively switch in the notch filter 510 in the path between the power amplifier 120 and the band pass filter 530.

The notch filter 510 can filter out a harmonic of an RF signal provided by the power amplifier 120 for selected intermittent and/or relatively rare occurrence emissions. For instance, the notch filter 510 can be switched in between an output of the power amplifier 120 and the band pass filter 530 to filter out a third harmonic of a Band 12 RF signal provided by the power amplifier 120 when the antenna is providing a Band 4 receive signal to receive path (not illustrated). In another example, the notch filter can filter out a second harmonic of a Band 13 signal when a GPS frequency band is active. The notch filter 510 can be configured to filter a particular frequency range for a specific application, for example, by selecting capacitance value(s), inductance value(s), resistance value(s), or any combination thereof of circuit elements in the notch filter 510. The notch filter 510 can be referred to as a band elimination filter.

The band pass filter 540 can have a different pass band than the band pass filter 530 in certain embodiments. Alternatively, the band pass filter 540 can have approximately the same pass band than the band pass filter 530 and these band pass filters can have different filter characteristics. For instance, in such implementations, the band pass filter 530 can have higher in band attenuation and/or higher out of band attenuation than the band pass filter 540.

The front end architecture illustrated in FIG. 5B includes a transmit select switch 110, a power amplifier 120, a notch filter 510, band pass filters 530, 530', and 540, an antenna switch module 130, and an antenna 140. The transmit select switch 110 can selectively electrically connect an output of the power amplifier 120 to a transmit path that includes the band pass filter 530' and the notch filter 510 for intermittent and/or relatively rare occurrence emissions. The antenna switch module 130 can electrically couple the transmit path that includes the band pass filter 530' and the notch filter 510 to the antenna 140 for the intermittent and/or relatively rare occurrence emissions. As shown in FIG. 5B, the notch filter 510 can be disposed in a signal path between the band pass filter 530' and the antenna switch module 130. Alternatively, the band pass filter 530' could be disposed in a signal path between the notch filter 510 and the antenna switch module 130. The band pass filters 530 and 530' can have the same pass band and similar filter characteristics (e.g., in band attenuation and/or out of band attenuation). In some embodiments, the band pass filters 530 and 530' can have different filter characteristics.

The front end architecture illustrated in FIG. 5C includes a first power amplifier 310, a second power amplifier 315, a select switch 320, a notch filter 510, band pass filters 530 and 530', an antenna switch module 130, and an antenna 140. In this front end architecture, two different power amplifiers are implemented. One of these two power amplifiers may be disabled while the other of these power amplifiers is enabled. These power amplifiers can be configured to amplify RF signals in the same transmit frequency band. The first power amplifier 310 can provide an output to the band select filter 530 without adding an insertion loss from an RF switch. The select switch 320 can selectively electrically connect the second power amplifier 315 to a signal path that includes the notch filter 510 and the band pass filter 530' or a signal path that includes the band pass filter 540. The signal path with the notch filter 510 and the band pass filter 530' can filter out a harmonic frequency of the RF signal provided by the second power amplifier 315 during an intermittent signaling mode. In an embodiment, the first power amplifier 310 can be configured to operate in ET mode for typical operation and the second power amplifier 315 can be configured to operate in APT mode for an intermittent signaling mode. The separate paths for the typical operation and for the intermittent signaling mode can be transparent to outside of a transmit module.

Figure 6:
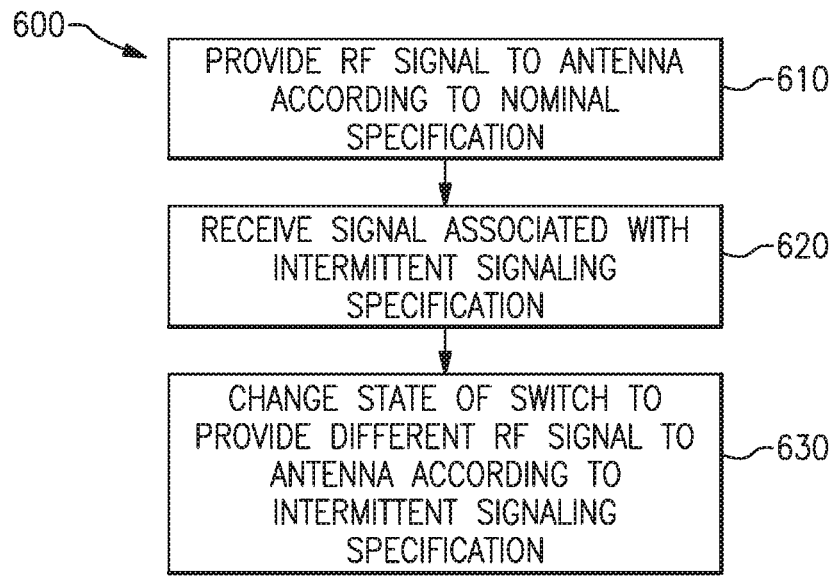
FIG. 6 is a flow diagram of an illustrative process of providing a radio frequency signal from a selected transmit path according to an embodiment.

FIG. 6 is a flow diagram of an example process 600 according to an embodiment. The process 600 can include more or fewer operations than illustrated. The process 600 can be implemented by any of the front end architectures discussed herein, such as, for example, any of the front end architectures of FIGS. 1A to 5C. At block 610, an RF signal can be provided to an antenna. The RF signal can be within a specified frequency band. As one example, the specified frequency band can be a transmit band for Band 13, which is from 777 MHz to 787 MHz. A signal associated with an intermittent emissions specification can be received at block 620. The intermittent signaling specification can be an NS specification from Table 1 above, for example. In one embodiment, the intermittent signaling specification can be an NS_07 specification. Responsive to receiving the signal at block 620, the state of a switch can be changed at block 630 such that a different RF signal is provided to the antenna in accordance with the intermittent signaling specification. At block 630, one or more of the switches discussed herein (such as a transmit select switch 110, one or more switches in the antenna switch module 130 or the antenna switch module 130', and a receive select switch 150 and/or 250) can change state. Accordingly, a plurality of switches can change state at block 630. The different RF signal can be within the same specified frequency band as the RF signal provided at block 610. The process can include generating the different RF signal such that the different RF signal has a higher linearity than the RF signal. Alternatively or additionally, the process can include generating the different RF signal such that the different RF signal has a higher attenuation outside of the specified frequency band than the RF signal.

Figure 7A:
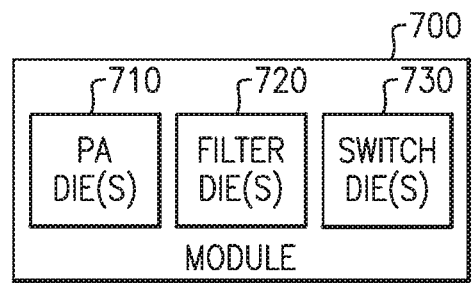
FIGS. 7A and 7B are schematic diagrams of packaged modules according to certain embodiments.
Figure 7B:
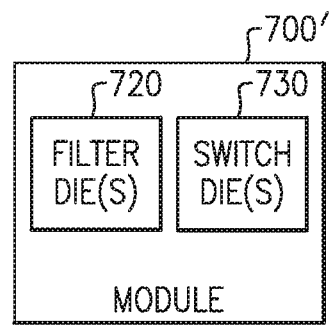

FIGS. 7A and 7B are schematic diagrams of packaged modules 700 and 700', respectively, according to certain embodiments. These modules can include one or more dies and/or other components integrated within a package. These modules can include a packaging substrate, such as a laminate substrate, configured to receive a plurality of components. The modules can include contacts, such as pins, for electrically connecting to other electronic components.

As illustrated in FIG. 7A, the packaged module 700 can include one or more power amplifier dies 710, one or more filter dies 720, and one or more switch dies 730. The power amplifier die(s) 710 can include any of the power amplifiers discussed herein. In an embodiment, a single power amplifier die 710 can include the power amplifiers illustrated in any of the front end architectures discussed herein. The filter die(s) 720 can include any of the filters and/or duplexers discussed herein. The filter die(s) 720 can include surface acoustic wave filter(s) and/or bulk acoustic wave filter(s), for example. According to certain embodiments, separate filter dies can implement separate duplexers. In an embodiment, one filter die can implement the co-packaged duplexer 210 and another filter die can implement another duplexer. The switch die(s) 730 can implement any of the switches discussed herein.

As illustrated in FIG. 7B, the packaged module 700' can include one or more filter dies 720 and one or more switch dies 730. In such embodiments, the packaged module 700' can include one or more contacts to provide an electrical connection to one or more power amplifiers.

Figure 8:
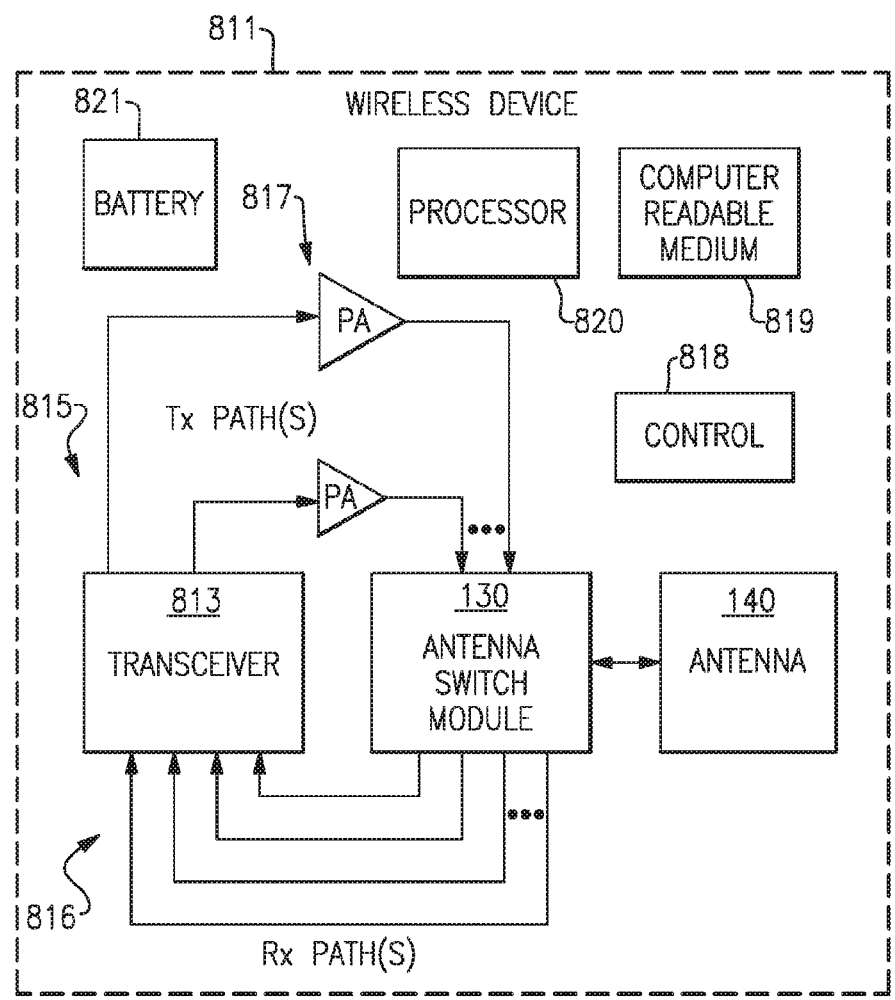
FIG. 8 is a schematic block diagram of an example mobile device that can include a front end architecture with any combination of features of the front end architectures discussed herein. The example mobile device of FIG. 8 can also perform the illustrative process of FIG. 6.

FIG. 8 is a schematic block diagram of one example of a wireless or mobile device 811 that can include one or more power amplifiers and one or more antenna switch modules. The wireless device 811 can transmit and/or receive paths that implement one or more features of the present disclosure. For instance, the power amplifiers 817 of FIG. 8 can correspond to any of the power amplifiers discussed with reference to FIGS. 1A to 7. Similarly, the antenna switch module 130 and the antenna 140 of FIG. 8 can correspond to any of the antenna switch modules and/or antennas, respectively, discussed herein. Additional elements, such as any of the duplexers discussed herein can be disposed between the output of any of the power amplifiers 817 and the antenna switch module 130 of FIG. 8.

The example wireless device 811 depicted in FIG. 8 can represent a multi-band and/or multi-mode device such as a multi-band/multi-mode mobile phone. By way of example, the wireless device 811 can communicate in accordance with Long Term Evolution (LTE). In this example, the wireless device can be configured to operate at one or more frequency bands defined by the LTE standard. The wireless device 811 can alternatively or additionally be configured to communicate in accordance with one or more other communication standards, including but not limited to one or more of a Wi-Fi standard, a 3G standard, a 4G standard or an Advanced LTE standard. Transmit and/or receive paths of the present disclosure can be implemented within a mobile device implementing any combination of the foregoing example communication standards, for example.

As illustrated, the wireless device 811 can include an antenna switch module 130, a transceiver 813, an antenna 140, power amplifiers 817, a control component 818, a computer readable storage medium 819, a processor 820, and a battery 821.

The transceiver 813 can generate RF signals for transmission via the antenna 140. Furthermore, the transceiver 813 can receive incoming RF signals from the antenna 140. The wireless device 811 can include a plurality of antennas, such as a primary antenna and a diversity antenna, in certain implementations. It will be understood that various functionalities associated with transmitting and receiving of RF signals can be achieved by one or more components that are collectively represented in FIG. 8 as the transceiver 813. For example, a single component can be configured to provide both transmitting and receiving functionalities. In another example, transmitting and receiving functionalities can be provided by separate components.

In FIG. 8, one or more output signals from the transceiver 813 are depicted as being provided to the antenna 140 via one or more transmit paths 815. In the example shown, different transmit paths 815 can represent output paths associated with different bands and/or different power outputs. For instance, the two different paths shown can represent two of the different transmit paths of any of the front end architectures discussed with reference to FIG. 3A to 4B or 5C. As another example, separate transmit paths can be provided from an output of a power amplifier 817 in accordance with the any of the front end architectures discussed with reference to FIG. 1A to 2B, 5A, or 5B. The transmit paths 815 can be associated with different transmission modes (e.g., a nominal mode and an intermittent signaling mode). Other transmit paths 815 can be associated with different power modes (e.g., high power mode and low power mode) and/or paths associated with different transmit frequency bands. The transmit paths 815 can include one or more power amplifiers 817 to aid in boosting a RF signal having a relatively low power to a higher power suitable for transmission. The power amplifiers 817 can include, for example, the power amplifier 120 or the power amplifiers 310 and 315 discussed above. Although FIG. 8 illustrates a configuration using two transmit paths 815, the wireless device 811 can be adapted to include more or fewer transmit paths 815.

In FIG. 8, one or more detected signals from the antenna 140 are depicted as being provided to the transceiver 813 via one or more receive paths 816. In the example shown, different receive paths 816 can represent paths associated with different signaling modes and/or different receive frequency bands. Although FIG. 8 illustrates a configuration using four receive paths 816, the wireless device 811 can be adapted to include more or fewer receive paths 816.

To facilitate switching between receive and/or transmit paths, the antenna switch module 130 can be included and can be used to selectively electrically connect the antenna 140 to a selected transmit or receive path. Thus, the antenna switch module 130 can provide a number of switching functionalities associated with an operation of the wireless device 811. The antenna switch module 130 can include a multi-throw switch configured to provide functionalities associated with, for example, switching between different bands, switching between different modes, switching between transmission and receiving modes, or any combination thereof.

FIG. 8 illustrates that in certain embodiments, the control component 818 can be provided for controlling various control functionalities associated with operations of the antenna switch module 130 and/or other operating component(s). For example, the control component 818 can aid in providing control signals to the antenna switch module 130 so as to select a particular transmit or receive path. For instance, the control component can generate a select signal for the antenna switch module 130 based at least partly on a signal associated with an intermittent signaling specification received by the wireless device 811.

In certain embodiments, the processor 820 can be configured to facilitate implementation of various processes on the wireless device 811. The processor 820 can be, for example, a general purpose processor or special purpose processor. In certain implementations, the wireless device 811 can include a computer-readable memory 819, which can store computer program instructions that may be provided to and executed by the processor 820.

The battery 821 can be any suitable battery for use in the wireless device 811, including, for example, a lithium-ion battery.

Although certain embodiments are discussed herein with reference to NS_07 mode and typical Band 13 modes for illustrative purposes, it will be understood that the principles and advantages discussed herein can be applied to any suitable implementation with an intermittent specification and a typical specification that have different design constraints. For instance, any of the principles and advantages discussed herein can be applied to any other NS_xy scenarios, coexistence requirements for emissions when simultaneous Wi-Fi operation happens in a handset, etc.

Some of the embodiments described above have provided examples in connection with power amplifiers and/or mobile devices. However, the principles and advantages of the embodiments can be used for any other systems or apparatus, such as any uplink cellular device, that could benefit from any of the circuits described herein. The teachings herein are applicable to a variety of power amplifier systems including systems with multiple power amplifiers, including, for example, multi-band and/or multi-mode power amplifier systems. The teachings described herein can be applied to a variety of power amplifier structures, such as multi-stage power amplifiers and power amplifiers employing a variety of transistor structures. The power amplifier transistors discussed herein can be, for example, gallium arsenide (GaAs) transistors, silicon germanium (SiGe) transistors, or silicon transistors. The power amplifiers discussed herein can be implemented by field effect transistors and/or bipolar transistors, such as heterojunction bipolar transistors.

Aspects of this disclosure can be implemented in various electronic devices. Examples of the electronic devices can include, but are not limited to, consumer electronic products, parts of the consumer electronic products, electronic test equipment, etc. Examples of the electronic devices can include, but are not limited to, a mobile phone such as a smart phone, a telephone, a television, a computer monitor, a computer, a modem, a hand-held computer, a laptop computer, a tablet computer, a personal digital assistant (PDA), a microwave, a refrigerator, a vehicular electronics system such as automotive electronics system, a stereo system, a DVD player, a CD player, a digital music player such as an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. When suitable, the word "or," in reference to a list of two or more items, is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments of the inventions have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A front end comprising:
   a first transmit bandpass filter having a pass band;
   a second transmit bandpass filter having approximately the same pass band as the first transmit bandpass filter, the second transmit bandpass filter configured to provide a higher out of band attenuation than the first transmit bandpass filter; and
   a switch element electrically coupled to the first transmit bandpass filter and the second transmit bandpass filter, the switch element configured to couple the first transmit bandpass filter to a port of the switch element in a first state and to couple the second transmit bandpass filter to the port of the switch element in a second state.

2. The front end of claim 1 wherein the switch element has a first throw configured to receive a first radio frequency signal from the first transmit bandpass filter and a second throw configured to receive a second radio frequency signal from the second transmit bandpass filter.

3. The front end of claim 2 wherein the port is an antenna port of the switch element, and the switch element is configured to selectively electrically couple the second transmit bandpass filter to the antenna port based at least partly on a signal indicative of an intermittent signaling mode.

4. The front end of claim 1 wherein the switch element is coupled between an antenna and the first transmit bandpass filter, and the switch element is coupled between the antenna and the second transmit bandpass filter.

5. The front end of claim 1 wherein the first transmit bandpass filter and the second transmit bandpass filter are included in a co-packaged duplexer that includes a single receive filter.

6. The front end of claim 5 wherein the port is an antenna port, and the switch element is configured to electrically couple the antenna port to the single receive filter and the first transmit filter in the first state and to electrically couple the antenna port to the single receive filter and the second transmit filter in the second state.

7. The front end of claim 1 further comprising a first power amplifier in communication with the first transmit bandpass filter and a second power amplifier in communication with the second transmit bandpass filter.

8. The front end of claim 7 wherein the first power amplifier is configured to operate in an envelope tracking mode and the second power amplifier is configured to operate in an average power tracking mode.

9. The front end of claim 1 wherein the second transmit bandpass filter is configured to provide a higher in band attenuation than the first transmit bandpass filter.

10. The front end of claim 1 wherein a frequency response of the second transmit bandpass filter is asymmetric about the pass band.

11. The front end of claim 1 wherein the higher out of band attenuation is below the pass band.

12. The front end of claim 1 further comprising a notch filter coupled to the second transmit bandpass filter.

13. The front end of claim 1 wherein the first transmit bandpass filter is an acoustic wave filter.

14. The front end of claim 1 wherein the pass band is from 777 MHz to 787 MHz.

15. A packaged module comprising:
a first transmit bandpass filter having a pass band;
a second transmit bandpass filter having approximately the same pass band as the first transmit bandpass filter, the second transmit bandpass filter configured to provide a higher out of band attenuation than the first transmit bandpass filter; and
a switch element electrically coupled to the first transmit bandpass filter and the second transmit bandpass filter, the switch element configured to couple the first transmit bandpass filter to a port of the switch element in a first state and to couple the second transmit bandpass filter to the port of the switch element in a second state; the first transmit bandpass filter, the second transmit bandpass filter, and the switch being within a common package.

16. The packaged module of claim 15 further comprising a power amplifier operatively coupleable to the first transmit bandpass filter, the power amplifier being configured to operate in an envelope tracking mode and to operate in an average power tracking mode, and the power amplifier being within the common package.

17. The packaged module of claim 15 wherein the first transmit bandpass filter has a lower insertion loss than the second transmit bandpass filter.

18. The packaged module of claim 15 wherein the port is an antenna port of the switch element.

19. A mobile device comprising:
a first transmit bandpass filter having a pass band;
a second transmit bandpass filter having approximately the same pass band as the first transmit bandpass filter, the second transmit bandpass filter configured to provide a higher out of band attenuation than the first transmit bandpass filter;
a switch element electrically coupled to the first transmit bandpass filter and the second transmit bandpass filter, the switch element configured to couple the first transmit bandpass filter to a port of the switch element in a first state and to couple the second transmit bandpass filter to the port of the switch element in a second state; and
an antenna electrically coupled to the switch element, the antenna configured to transmit a radio frequency signal provided by the switch element.

20. The mobile device of claim 19 further comprising a power amplifier and a select switch coupled between the power amplifier and the second transmit bandpass filter.

21. The mobile device of claim 19 wherein the switch element is configured to couple the second transmit bandpass filter to the antenna in an intermittent signaling mode.

* * * * *